Figure 1:
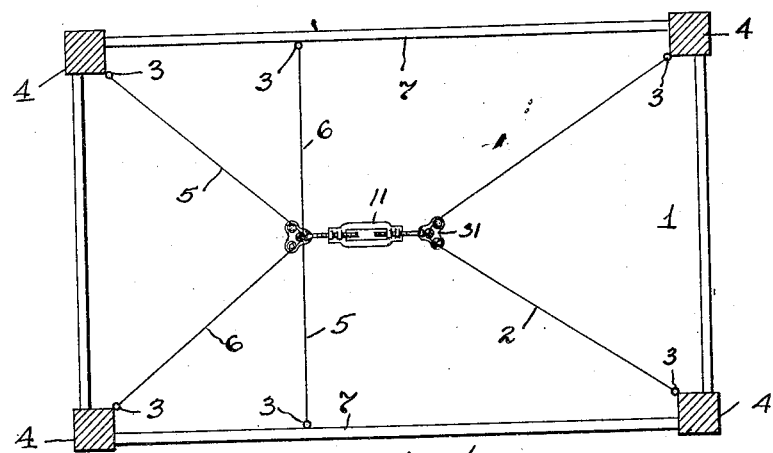

Sept. 20, 1932. T. H. WITTLIFF 1,878,055
STAMPED METAL ARTICLE AND METHOD OF MAKING SAME
Filed Nov. 14, 1925 3 Sheets-Sheet 1

INVENTOR.
Theodore H. Wittliff
BY
Fay, Oberlin & Fay
ATTORNEYS.

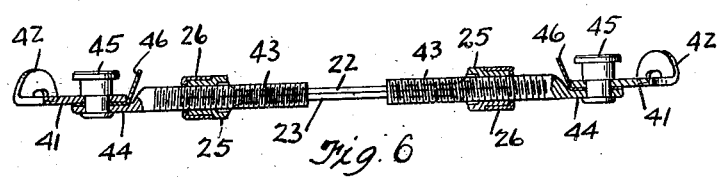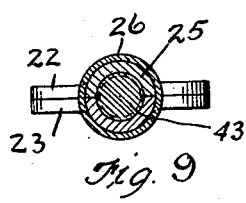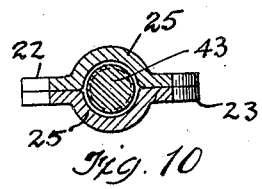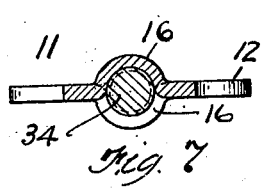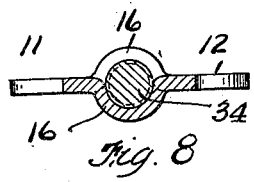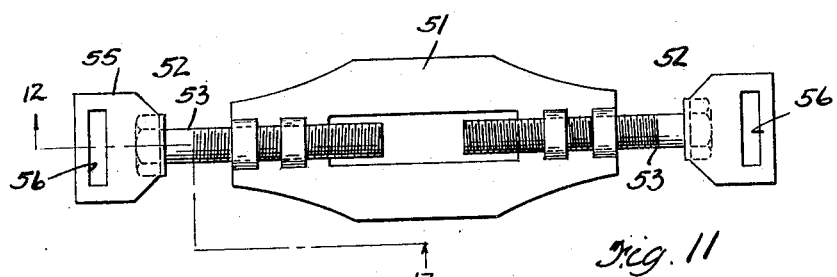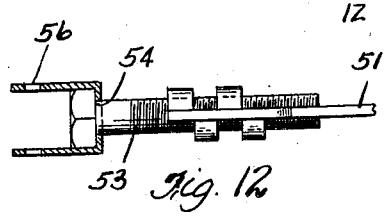

Sept. 20, 1932. T. H. WITTLIFF 1,878,055
STAMPED METAL ARTICLE AND METHOD OF MAKING SAME
Filed Nov. 14, 1925  3 Sheets-Sheet 3
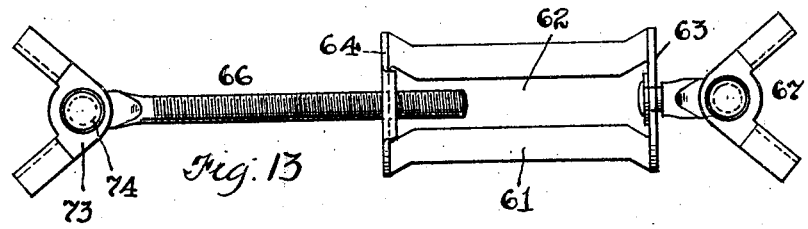
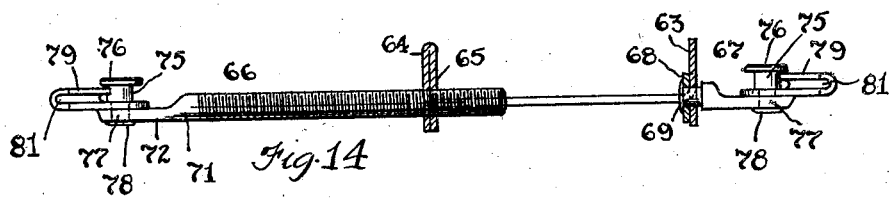
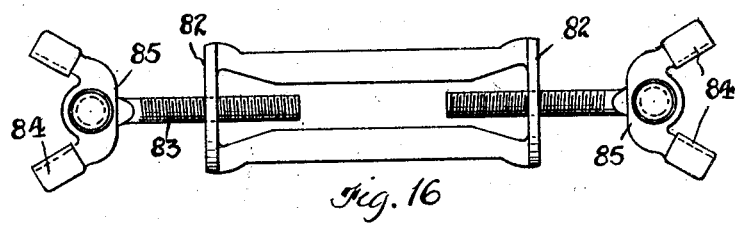
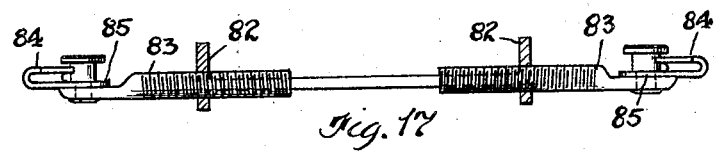
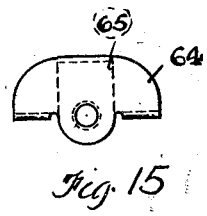
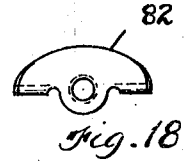
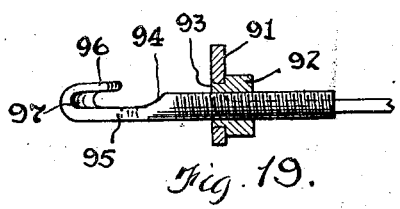
INVENTOR.
Theodore H. Wittliff
BY
Fay, Oberlin &Fay
ATTORNEYS.

Patented Sept. 20, 1932

1,878,055

UNITED STATES PATENT OFFICE

THEODORE H. WITTLIFF, OF CLEVELAND, OHIO

STAMPED METAL ARTICLE AND METHOD OF MAKING SAME

Application filed November 14, 1925. Serial No. 68,956.

This invention, as indicated, comprises an improved stamped metal article, such as a turnbuckle, and a method of making the same. More particularly it comprises the cutting of a stamped metal article so as to give it a predetermined shape, and simultaneously forming socket sections thereon, and thus providing a novel type of article adapted to engage the screw threads of a bolt or similar member. While the invention will be described in connection with a turnbuckle and a method of making the same, it is to be understood that it is not intended to thereby restrict the same, or to exclude from the scope of the claims such other articles and their method of production to which the invention may be applicable. For example wing nuts, wall hooks, drawer handles, and the like may also be made in accordance with the principle of the invention.

The invention is particularly adapted to the production of a turnbuckle, which may be formed principally of a number of sheet metal parts suitably united to effect every function of a turnbuckle made of cast metal parts, but which may be manufactured at a greatly reduced cost and which will have advantages over such cast metal devices in the matter of greater lightness, for equal strength, and greater ease of assembly and operation.

Heretofore it has been the practice to form the body portion of a turnbuckle from a casting provided with an open center section and having an enlargement or boss at either end provided with aligned sockets suitably tapped to receive the respective screw threaded shanks of the terminal elements. The terminal elements likewise were formed of castings and the shanks thereof suitably screw threaded to engage the sockets. These operations necessarily involved a series of steps entailing considerable expense in the matter of equipment and labor.

The principal object of the present invention is to provide an improved sheet metal article, such as a turnbuckle, or the like, and an improved method of making the same, which will result in greater economy of manufacture and which will include the maximum use of stamping operations in lieu of casting and machining operations.

Another object of the present invention is to provide an improved method of forming a socket section in a body member of sheet metal and thus provide an article which will satisfactorily co-act with a threaded bolt or shank and will be of strong and simple construction and capable of use in place of cast or solid articles of the type in common use.

Another object is to provide as a single operation a method of cutting and forming a sheet metal blank into an article, such as a turnbuckle body member, and providing such article with offset oppositely faced socket sections screw threaded to adapt the same to engage the screw threaded shank of a bolt or terminal member of a turnbuckle.

A further object is to provide a method of producing a screw threaded member such as the terminal element of a turnbuckle by uniting a number of parts in rigid relation to a sheet metal head or plate section and thus to produce an article having great strength and at the same time embodying improved structural features particularly adapting the same for its special use.

Other and further objects will appear in the course of the folowing description. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 2:
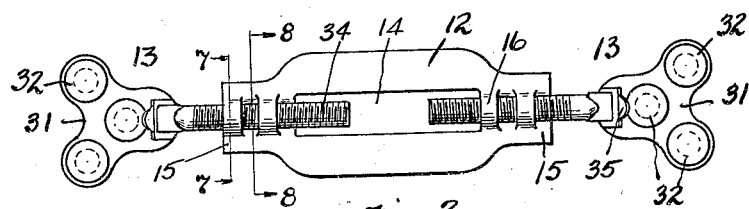
Figure 3:
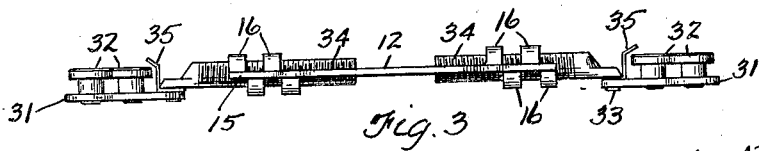
Figure 4:
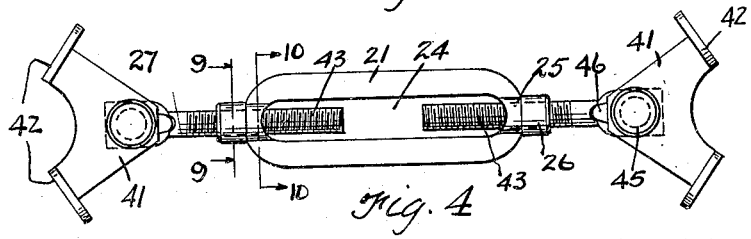
Figure 5:
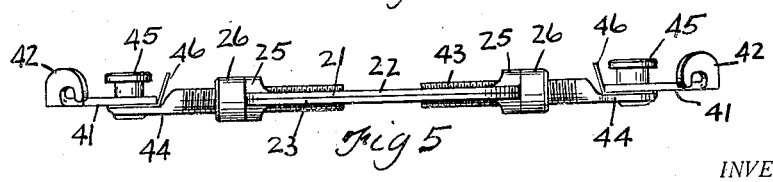

In said annexed drawings:

Fig. 1 is a top plan view of a head frame showing an improved tensioning device applied thereto; Fig. 2 is a top plan view of one form of turnbuckle embodying the principle of my invention; Fig. 3 is a side elevation of the turnbuckle shown in Fig. 2; Fig. 4 is a top plan view of a modified form of turnbuckle; Fig. 5 is a side elevation of the turnbuckle shown in Fig. 4; Fig. 6 is a central longitudinal section showing the turnbuckle illustrated in Figs. 4 and 5; Figs. 7 and 8 are transverse sectional views taken along the lines 7—7 and 8—8, respectively, shown in Fig. 2; Figs. 9 and 10 are transverse sectional views taken along the lines 9—9 and 10—10, respectively, shown in Fig. 4; Fig. 11 is a top plan view of another modified form of turnbuckle; Fig. 12 is a fragmentary view taken along the line 12—12 shown in Fig. 11, looking in the direction of the arrows; Fig. 13 is a top plan view of a modified form of turnbuckle embodying the principle of my invention; Fig. 14 is a side elevation of the turnbuckle shown in Fig. 13 with the body portion thereof shown partly in section; Fig. 15 is an end view showing the overlapped body portion of the turnbuckle; Fig. 16 is a top plan view of still another modified form of turnbuckle embodying the principle of my invention; Fig. 17 is a side elevation of the turnbuckle shown in Fig. 16 with the body portion thereof shown partly in section; Fig. 18 is an end view of the body portion of the turnbuckle shown in Figs. 16 and 17; and Fig. 19 is a fragmentary sectional view showing a modified form of turnbuckle body and terminal member.

While several of the figures of the drawings show the cable engaging elements of the turnbuckle on the upper side thereof, it is obvious that when conditions require, said elements may be reversed in position.

As is shown in Fig. 1 of the drawings, the turnbuckle when applied to a furniture brace, is engaged with a plurality of flexible members having their respective ends secured to the corner posts, or side frame members of the article of furniture, such as a bed. Thus the bed 1, shown in Fig. 1, has a flexible member or cable 2 connected at its ends to hooks, or similar fastening elements 3, secured to the inner corners of the posts 4, and other cables 5, 6, connected to an end post and a side frame member 7, by similar hooks or other fastening elements.

The turnbuckle 11 is engaged at one end with the cable 2, and at the other end with the cables 5 and 6. The rotation of the turnbuckle body member serves to firmly draw the parts of the article of furniture into rigid relation with each other.

The turnbuckle shown in Fig. 1 is shown in enlarged views in Figs. 2 and 3, and comprises a body member 12, and a pair of built-up terminal members 13. The body member is formed of sheet metal stock of suitable gauge and is formed of a widened central plate provided with a central elongated slot 14 and a pair of end sections 15 of narrower width.

The end sections have a number of socket sections 16 pressed from the plane of said plate into semicylindrical webs and projecting alternately from opposite sides thereof. Thus through the co-action of the several oppositely disposed socket sections, an interrupted socket is provided to receive the shanks of the terminal elements. The socket is not of the usual type presenting continuous uninterrupted wall surface but is made up of the semicylindrical sections staggered with respect to each other, and is interrupted by the intervening openings through which the shank of the terminal element is exposed to view.

A simple stamping operation serves to cut out the central portion, and the plate margins and form the socket sections. The screw threads may be tapped-in in the usual manner, or they may be formed simultaneously with the stamping operation, the die sections carrying proportionate sectional areas of a continuous screw thread for the full length of the socket.

In Figs. 7 and 8, the socket sections are shown to be of substantially full semicylindrical shape, and to be alternately disposed on opposite sides of the shank of the terminal member.

The modified form of turnbuckle shown in Figs. 4, 5, 6, 9 and 10, comprises a body member 21 formed of two identically shaped plates 22, 23, provided with large central openings 24 and semicylindrical socket sections 25 at the extension ends of the plates. The plates are placed together with the socket halves opposite each other and a sleeve or collar 26 is pressed over the projecting portions thereof at each end to hold the parts in rigid engagement with each other. The sockets in this form of body member are continuous and the screw threads may be formed by tapping or may be pressed in as the socket halves are formed. A built up terminal member 27 of a modified form is shown and will be hereinafter described in detail.

The last described body member as stated is formed of a pair of stamped plates and requires an assembling operation but the finished article very closely approaches the appearance of the cast metal turnbuckles where such feature is desirable. It is much less expensive to manufacture than those of cast metal and is a construction of great strength and satisfactory operation.

The terminal elements 13 are formed in part of stampings, comprising the head plates 31 of V-shape and having triangularly spaced sockets into which flanged studs 32 are inserted and secured. At the inner ends of the plates, slots are provided into which flattened extensions 33 on the ends of screw-threaded shanks 34 are rigidly engaged. A thin metal cable-retaining clip 35 is preferably secured at the same point.

The modified form of terminal shown in Figs. 4, 5, 6, 9 and 10, is formed of a stamped metal head plate 41 of V-shape and having integrally formed hooks 42 at the free ends thereof. The screw-threaded shanks 43 are provided with flattened terminal portions 44 through which apertures are formed in alignment with like apertures in the inner ends of the V-shaped plates. The studs 45 are riveted through said parts and secure the same firmly together. A retaining clip 46 may be inserted between the plates so joined with the free end thereof projecting adjacent the flanged head of the securing stud.

The form of construction shown in Figs. 11 and 12 includes a body member 51 similar to that shown in Figs. 2 and 3. The terminal members 52 thereof are of a modified form of construction. Standard bolts 53 having hexagonal heads are used and sheet metal plates 54 having a central aperture of a size to receive the bolt shank, and transverse slots 55 adjacent the ends, are folded about said heads to bring said slots into alignment and the plate sides into firm engagement with the adjacent faces of the hexagonal heads. Thus with a minimum of material, a satisfactory turnbuckle is provided. The slots are intended particularly to engage steel tape tensioning members, but when engagement with wire cables is desired, suitable hooks or studs may be supplied in plates of otherwise similar construction.

The form of construction shown in Figs. 13, 14 and 15, comprises a body member 61 formed from sheet metal and having an elongated open central portion 62 and end walls 63, 64, pressed to a position at right angles to the central portion of said body member and apertured to receive the respective terminal members. The central slot may be made of slightly greater width adjacent to the end walls of the body member to improve its appearance and also to provide clearance for reinforcing members for said end walls. The end wall 64 as is more clearly shown in Figs. 14 and 15 is reinforced by having an extension 65 thereof turned downwardly against the inner wall of the main portion thereof, the double thickness of metal thus provided is apertured centrally of said wall in the plane of the side members of said body and is screw-threaded to receive the screw-threaded shank of the terminal element 66. The opposite end wall 63 is similarly apertured to receive the shank of the swivelling terminal element 67. The shank of said terminal element after passing through the aperture in said wall 63 is engaged through a washer 68 of substantial area and is formed with a substantial head 69 which bears against the free face of said washer. The element 67 is thus adapted to swivel freely in the end wall of said body member. The terminal element employed with the wall 65 at the other end of the body member in this form of construction comprises a screw-threaded shank 71 having a flattened end portion 72 through which an aperture is provided. Cable engaging elements comprising a plate 73 and a stud 74 are adapted to be secured thereto. The stud has a cylindrical body portion 75 terminating in the enlarged head 76. The lower portion 77 of said stud is of smaller diameter so as to provide a shoulder, and is of a size to engage the aperture through the flattened portion 72 of the shank. The plate 73 is of substantially V-shape and has an enlarged central portion through which an aperture of a size corresponding to that through the flattened portion of the shank is provided. The lower portion of the stud is passed through the apertures in the plate and shank and formed with a head 78 on the under side of the shank to securely hold the parts in rigid relation. The wing members of the plate 73 have extensions 79 on the inner edges which are turned so as to over-lie the body portions thereof in spaced relation, thereby providing a cable-receiving groove 81. The grooves thus formed lie upon lines tangential to the surface of the cylindrical body portion of the stud 75 and thus serve as guides and supports and provide extended frictional engagement with the cable with which such terminal elements cooperate. The construction of the head portion of the swiveling terminal element is substantially identical with that just described.

In the form of construction shown in Figs. 16 and 17, a different form of body member is provided, the same being constructed of slightly heavier gauge material and the end walls being of lesser height than in the form just described and without reinforcement. The end walls 82 are identical in size and shape and are centrally apertured in the plane of the side members of the body and screw-threaded to receive the screw-threaded shanks of the terminal members 83. The terminal elements correspond substantially with those shown in Figs. 13 and 14, except that the wing portions and extensions 84 thereof are of slightly greater width and of less length than those shown in Figs. 13 and 14. The front edge 85 of the V-shaped plate is flattened instead of being rounded in order to provide for a greater width of material at the angles of the plate. The grooves in this turnbuckle are similarly disposed along lines tangential to the cylindrical surface of the stud in order to serve as guides and supports and provide an increased frictional area for engagement with the cables. The form of turnbuckle shown in Fig. 19 provides for an end wall 91 similar to the end wall of the turnbuckle shown in Figs. 16 to 18 inclusive. The end wall is provided with an aperture in alignment with the plane of the side members of the body of greater diameter than those heretofore described in order to receive internally screw-threaded members 92 having extensions 93 of smaller diameter which provide shoulders to engage against the inner surface of the end wall 91. The extensions are riveted over to firmly engage the margins of the apertures through the end walls. The members 92 may have cylindrical exteriors or may be in the form of nuts of polygonal exterior outline, and they may be secured in any preferred manner to the end walls of the stamped body portion of the turnbuckle so as to be rotatable therewith and form the means of receiving the screw-threaded shanks of said terminal elements.

The terminal element illustrated in Fig. 19 comprises a screw-threaded shank portion 94 having a flattened head portion 95 of V-shape which is turned over at its upper edge 96 to provide a cable-engaging groove 97 of V-shape in plan view. The headed portion is flattened beneath the central horizontal plane of the shank so that when the edge portion is turned over, the cable will be maintained in substantially the plane of said shank, and tension will thus be exerted along the axial line of the respective shanks.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:—

1. A tensioning device comprising a pair of terminal elements each provided with a sheet metal head plate, having cable-engaging elements, a screw threaded shank, means securing said plate to one end of said shank, and a body member formed of sheet metal provided with screw threaded sockets at its respective ends to engage the shanks of said terminals.

2. A tensioning device comprising a pair of terminal elements each provided with a sheet metal head plate, having cable-engaging elements, a screw threaded shank, a stud securing said plate to one end of said shank, and a body member formed of sheet metal having a portion at each end provided with a screw threaded shank engaging socket.

3. A built up terminal element for a turnbuckle comprising a sheet metal head plate, a plurality of cable engaging elements secured thereto and projecting to one side thereof, a cable holding clip, a screw threaded shank and means securing said clip and shank to said head plate.

4. A built up terminal element for a turnbuckle comprising a sheet metal head plate, having diverging grooved arms, a screw threaded shank having a flattened end portion rigidly secured to said plate by a stud having a flanged head spaced above said plate, said stud cooperating with said arms in forming a cable engaging means.

5. A built up terminal element for a turnbuckle comprising a sheet metal head plate, having diverging grooved arms, a screw threaded shank having a flattened end portion rigidly secured to said plate by means of a cylindrical stud having a flanged head spaced above said plate, said grooves lying upon lines tangential to the surface of said cylindrical stud and cooperating with said stud in forming a cable engaging means.

6. A turnbuckle body formed of a single piece of sheet metal with the central area removed to provide a large central opening with narrow flat side members and relatively wider end members, each entire flat end member being bent at right angles to project to each side of the plane of the sheet, and each having a screw-threaded aperture through the same to receive the screw-threaded shank of a terminal member, said apertures being in alinement with each other and lying axially in the plane of said sheet.

7. A turnbuckle body formed of a single piece of sheet metal with the central area removed to provide a large central opening with narrow flat side members and relatively wider end members, each entire flat end member being bent at right angles to project to each side of the plane of the sheet, and each having an aperture through the same to receive the shank of a terminal member, at least one end member and one shank having cooperating screw-threads for tensioning movement, said apertures being in alinement with each other and lying axially in the plane of said sheet.

Signed by me this 5th day of November, 1925.

THEODORE H. WITTLIFF.